(12) United States Patent
Ketchantang

(10) Patent No.: US 9,325,707 B2
(45) Date of Patent: Apr. 26, 2016

(54) METHOD FOR IDENTIFYING/AUTHENTICATING A PERSON USING THE VENOUS NETWORK THEREOF

(71) Applicant: MORPHO, Issy-les-Moulineaux (FR)

(72) Inventor: William Ketchantang, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/433,488

(22) PCT Filed: Apr. 30, 2014

(86) PCT No.: PCT/EP2014/058872
§ 371 (c)(1),
(2) Date: Apr. 3, 2015

(87) PCT Pub. No.: WO2014/177637
PCT Pub. Date: Nov. 6, 2014

(65) Prior Publication Data
US 2015/0264046 A1 Sep. 17, 2015

(30) Foreign Application Priority Data
May 3, 2013 (FR) .................................... 13 54081

(51) Int. Cl.
*H04L 29/06* (2006.01)
*G06K 9/00* (2006.01)
(Continued)

(52) U.S. Cl.
CPC ........ *H04L 63/0861* (2013.01); *G06K 9/00885* (2013.01); *G06K 9/4604* (2013.01);
(Continued)

(58) Field of Classification Search
CPC .. H04L 63/0861; H04L 67/10; G06K 9/4604; G06K 9/6267; G06K 9/6202; G06K 9/46; G06K 9/00885; G06K 2009/00932
See application file for complete search history.

(56) References Cited

U.S. PATENT DOCUMENTS

| 7,720,307 | B2 * | 5/2010 | Iizuka | G06K 9/4633 382/115 |
| 8,139,825 | B2 * | 3/2012 | Abe | G06K 9/00 382/115 |
| 2006/0047970 | A1 * | 3/2006 | Mochizuki | G06K 9/00 713/186 |
| 2009/0175505 | A1 | 7/2009 | Muquit et al. | |

(Continued)

FOREIGN PATENT DOCUMENTS

JP 2011-065302 A 3/2011

OTHER PUBLICATIONS

Jul. 30, 2014 Search Report issued in International Application No. PCT/EP2014/058872.

*Primary Examiner* — Saleh Najjar
*Assistant Examiner* — Devin Almeida
(74) *Attorney, Agent, or Firm* — Oliff PLC; R. Brian Drozd

(57) ABSTRACT

A person may be identified by at least an identification system including a device for capturing an image of a venous network of a finger and a database containing reference venous network images partitioned by class according to topological characteristics and for each class reference topological characteristics. In one embodiment, an image of the venous network is captured, transmitted to the processing unit, centered relative to a display window, and cut into at least two bands parallel to the finger's axis. A set of each band's topological characteristics is extracted. A distance between the extracted set and all reference topological characteristics of the class is calculated, for each class. The venous network image is classified in the class corresponding to the smallest distance and is compared with each reference venous network image in the class. The authenticity of the person from the result of the comparison step is decided.

7 Claims, 2 Drawing Sheets

Figure 1:
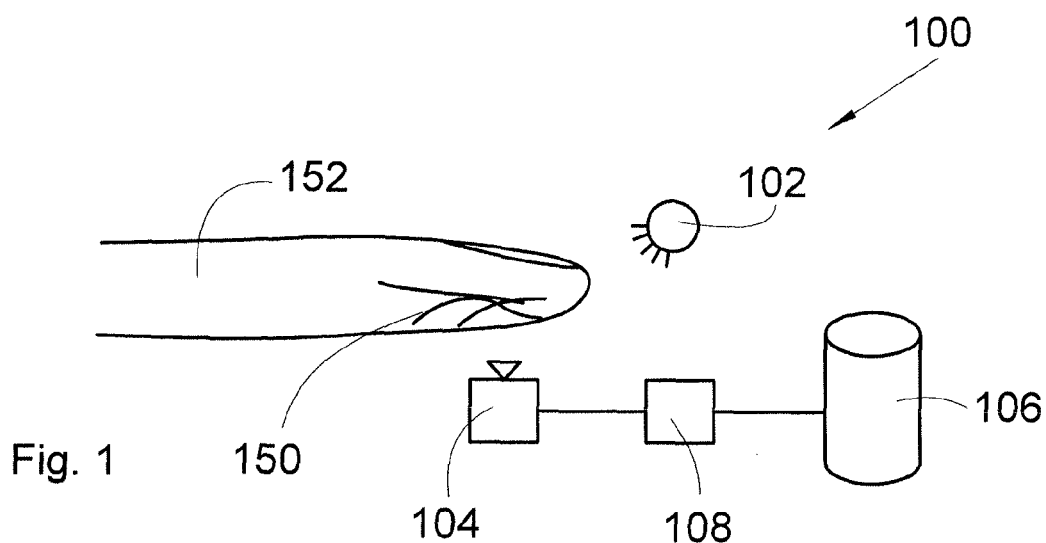

(51) Int. Cl.
*G06K 9/46* (2006.01)
*G06K 9/62* (2006.01)
*H04L 29/08* (2006.01)

(52) U.S. Cl.
CPC ............ *G06K9/6202* (2013.01); *G06K 9/6267* (2013.01); *H04L 67/10* (2013.01); *G06K 2009/00932* (2013.01)

(56) References Cited

U.S. PATENT DOCUMENTS

2010/0202665 A1   8/2010   Mohammad et al.
2012/0170816 A1   7/2012   Tsukiori
2012/0263357 A1* 10/2012   Xu .................... G06K 9/00013
                                                                        382/128

* cited by examiner

METHOD FOR IDENTIFYING/AUTHENTICATING A PERSON USING THE VENOUS NETWORK THEREOF

The present invention relates to a method for authenticating/identifying a venous network in a database, as well as a system for authenticating/identifying a venous network suitable for implementing such an authentication/identification method.

It finds an application in the field of biometric recognition and in particular in the field of identification by analysing the venous network of a finger.

A method is known for identifying/authenticating a person by analysing the venous network of a finger that is implemented by an identification/authentication system. The identification/authentication method comprises a step of illuminating the finger by means of a near-infrared beam (700 and 900 nm), and a step of capturing an image of the venous network of the finger thus illuminated by means of an infrared camera. The identification method then continues with a step of comparing the image of the venous network thus obtained with reference venous network images in a database and a decision-taking step concerning the authenticity/identity of the person from the result of the comparison step.

Even though such a method gives good results, it has its limits. In particular, the database may have a large number of reference venous network images, and the comparison and decision time may then be relatively lengthy, which causes an inconvenience for the person waiting.

One object of the present invention is to propose a method for authenticating/identifying a venous network that allows more rapid processing during the authentication/identification of a person.

To this end, a method is proposed for identifying/authenticating a person by means of an identification/authentication system comprising a capture device provided for capturing an image of a venous network of a finger of said person, a processing unit and a database containing reference venous network images partitioned by class according to topological characteristics and for each class a set of reference topological characteristics, the method comprising:

a capture step during which the capture device captures an image of the venous network, a transmission step during which the capture device transmits the image of the venous network thus captured to the processing unit, a centring step during which the processing unit centres the image of the venous network with respect to a display window, a cutting step during which the processing unit cuts the image of the venous network thus centred into at least two bands parallel to the axis of the finger, a first extraction step during which the processing unit extracts a set of at least one topological characteristic of each band, a distance step during which the processing unit calculates, for each class, a distance between the set thus extracted and all the reference topological characteristics of said class, a classification step during which the processing unit allocates the image of the venous network to the class corresponding to the smallest distance, a comparison step during which the processing unit compares the image of the venous network with each reference venous network image in the class to which the image of the venous network is thus allocated, and a decision-taking step during which the processing unit takes a decision concerning the authenticity/identity of the person from the result of the comparison step.

Advantageously, the identification/authentication method comprises, between the first extraction step and the distance step, a second extraction step during which the processing unit extracts a set of at least one topological characteristic relating to each pair of bands and concatenates this set with the set obtained during the first extraction step as a new set thus extracted.

Advantageously, the identification/authentication method comprises, between the transmission step and the centring step, a pre-processing step during which the image of the captured venous network is cleaned.

Advantageously, the topological characteristics are among the following topological characteristics:

for each band:
the surface area of the image of the venous network in the band,
the geometric centre of the image of the venous network in the band,
the geometric dispersion of the image of the venous network in the band,
the orientation histogram of the branches of the image of the venous network in the band,
the number of bifurcations in the branches of the image of the venous network in the band,
the geometric centre of the bifurcations in the band,
the geometric dispersion of the bifurcations in the band, for each pair of bands:
the distance between the surface of the image of the venous network of the first band of said pair, and the surface of the image of the venous network of the second band of said pair,
the distance between the geometric centre of the image of the venous network of the first band of said pair and the geometric centre of the image of the venous network of the second band of said pair,
the distance between the orientation histogram of the branches of the image of the venous network of the first band of said pair, and the orientation histogram of the branches of the image of the venous network of the second band of said pair.

The invention also proposes a system for identifying/authenticating a person by the venous network of a finger, the system being intended to implement the identification/authentication method according to one of the above variants and comprising:

a capture device provided for capturing an image of the venous network,
a processing unit,
a database containing reference venous network images partitioned by class according to topological characteristics and for each class a set of reference topological characteristics,
transmission means provided for transmitting the image of the venous network thus captured to the processing unit,
the processing unit comprising:
centring means provided for centring the image of the venous network with respect to the display window,
cutting means provided for cutting the image of the venous network into at least two bands parallel to the axis of the finger,
first extraction means provided for extracting a set of at least one topological characteristic of each band,
distance means provided for calculating, for each class of the database, a distance between the set extracted by the extraction means and the set of reference topological characteristics of said class, classification means provided for allocating the image of the venous network to the class corresponding to the smallest distance, comparison means provided for comparing the image of the venous network with each reference venous network image of the class to which the image of the venous network is allocated by the classification means, and decision-taking means provided for taking a decision concerning the authenticity/identity of the person from the comparison made by the comparison means.

Advantageously, the processing unit comprises second extraction means provided for extracting a set of at least one topological characteristic relating to each pair of bands and for concatenating this set with the set obtained by the first extraction means as a new extracted set.

Advantageously, the processing unit comprises pre-processing means for cleaning the image of the venous network captured.

Figure 2:
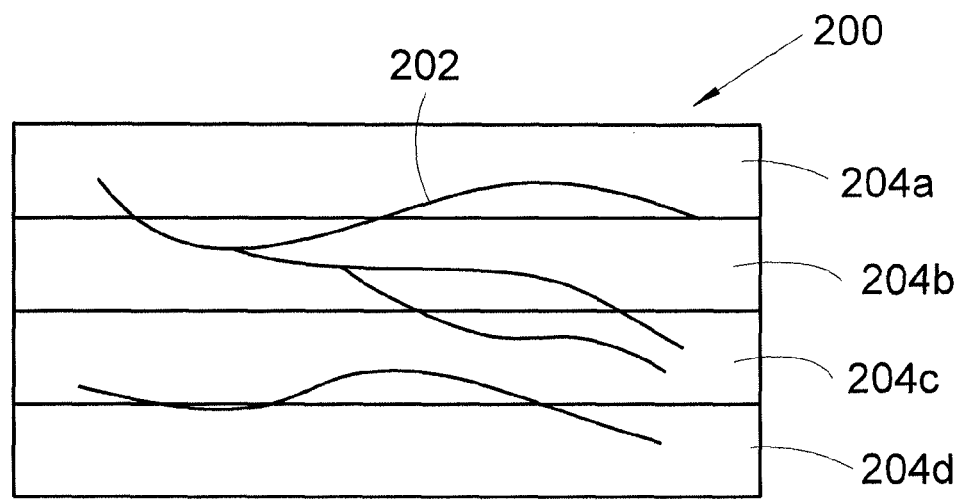
Figure 3:
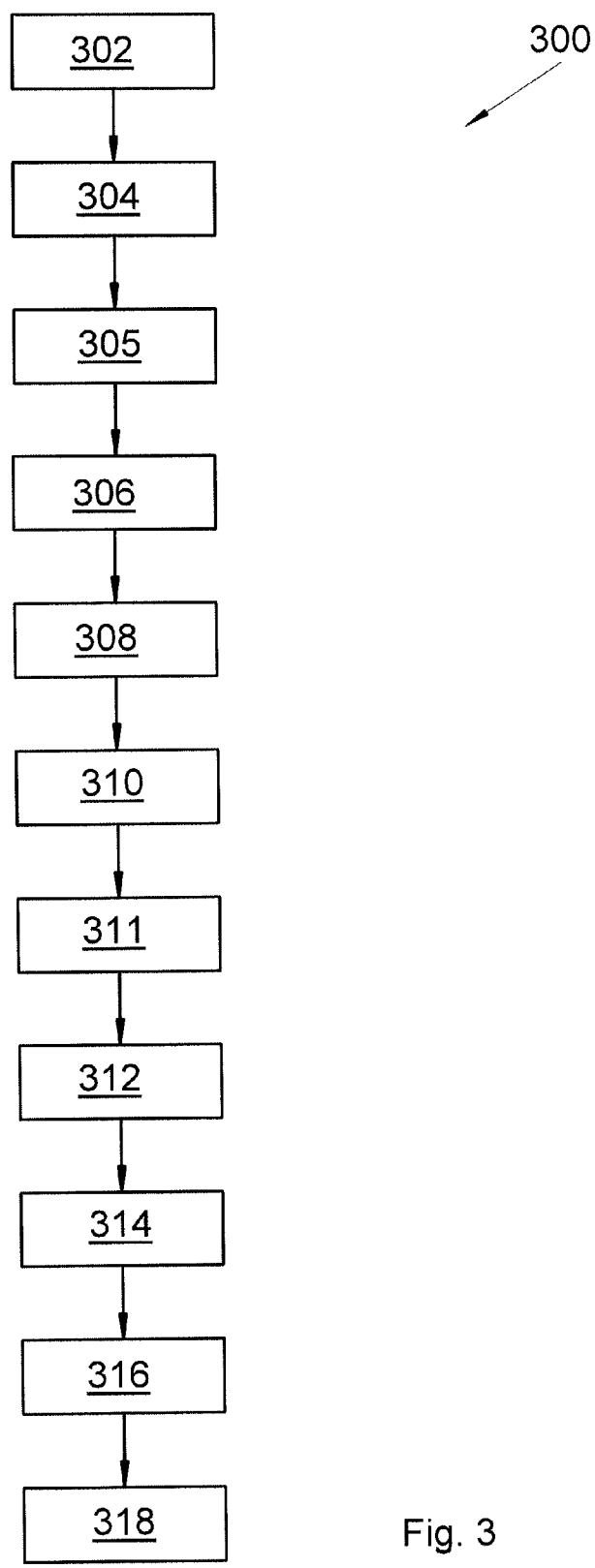

The characteristics of the invention mentioned above, as well as others, will emerge more clearly from a reading of the following description of an example embodiment, said description being given in relation to the accompanying drawings, among which:

FIG. 1 depicts an authentication/identification system according to the invention, FIG. 2 depicts an image of a venous network, and FIG. 3 depicts an algorithm of an authentication/identification method according to the invention.

FIG. 1 shows an authentication/identification system 100 implemented in the context of a venous network 150 of a finger 152 of a person.

The authentication/identification system 100 comprises a capture device 102, 104 intended to capture an image of the venous network 150, a processing unit 108, and a database 106 connected to the processing unit 108.

The database 106 contains the images of the reference venous networks, that is to say the images of the venous networks that are considered to belong to authorised persons.

The capture device 102, 104 comprises here a near-infrared lighting source 102 (700 and 900 nm) and an infrared camera 104. The typical wavelength is 850 nm, but any wavelength between 700 and 950 nm is suitable.

In the embodiment of the invention presented here, the image of the venous network 150 is acquired by lighting the finger 152 from the side, but other embodiments can be envisaged, such as for example by reflection of light on the finger or by transmission, by means of the placing of lighting placed below or above the finger 152.

In the embodiment in FIG. 1, the lens of the infrared camera 104 faces the lighting source 102. When the finger 152 is placed, it comes to be positioned between the lighting source 102 and the infrared camera 104. The lighting source 102 illuminates the side of the finger 152. The infrared light is then diffused by the subcutaneous tissues and absorbed by the deoxygenated haemoglobin, which makes it possible to view the venous network 150, which is situated at a few millimeters from the palm of the finger 152.

The image of the venous network 150 thus captured is transmitted to the processing unit 108.

FIG. 2 shows a display window 200 on which there appears the image 202 of the venous network 150 thus transmitted to the processing unit 108, and hereinafter referred to as the "image of the venous network 202".

The image of the venous network 202 is centred with respect to the display window 200 and is then divided into at least two bands 204a-d (here there are four bands) parallel to the axis of the finger 152.

At least one characteristic of the image of the venous network 202 is extracted from each band 204a-d, in particular a characteristic relating to the topology of the image of the venous network 202 in said band 204a-d. This characteristic is referred to hereinafter as a "topological characteristic".

From each pair of bands 204a-d, at least one characteristic relating to the topology of the image of the venous network 202 between the two bands 204a-d of said pair can also be extracted. This characteristic is also hereinafter referred to as a "topological characteristic".

The topological characteristics are of various types such as for example:

for each band 204a-d:

the surface of the image of the venous network 202 in the band 204a-d, which can be represented by the number of pixels representing the venous network 150 in the band 204a-d, the geometric centre of the image of the venous network 202 in the band 204a-d, which can be represented by the barycentre of the pixels representing the venous network 150 in the band 204a-d, the geometric dispersion of the image of the venous network 202 in the band 204a-d, which can be represented by the standard deviation of the pixels representing the venous network 150 in the band 204a-d with respect to the geometric centre of the image of the venous network 202, the orientation histogram of the branches of the venous network 202 in the band 204a-d, the number of bifurcations of the branches of the image of the venous network 202 in the band 204a-d, the geometric centre of the bifurcations in the band 204a-d, which can be represented by the barycentre of the bifurcations in the band 204a-d, the geometric dispersion of the bifurcations in the band 204a-d, which can be represented by the standard deviation of the bifurcations in the band 204a-d with respect to the geometric centre of the bifurcations, for each pair of bands 204a-d:

the distance between the surface of the image of the venous network 202 of the first band 204a-d in said pair, and the surface of the image of the venous network 202 of the second band 204a-d in said pair, the distance between the geometric centre of the image of the venous network 202 of the first band 204a-d in said pair and the geometric centre of the image of the venous network 202 of the second band 204a-d in said pair, the distance between the orientation histogram of the branches of the image of the venous network 202 of the first band 204a-d in said pair, and the orientation histogram of the branches of the image of the venous network 202 of the second band 204a-d in said pair.

The database 106 is partitioned into several classes ("data clustering"), the reference images of each class sharing common topological characteristics between them.

To effect the partitioning of the database 106, each image of the reference venous network of the database 106 undergoes the same processing, which consists of:

centring the image of the reference venous network with respect to the display window 200, cutting the image of the reference venous network thus centred into at least two bands 204a-d parallel to the axis of the finger 152, extracting from each band 204a-d at least one topological characteristic of the image of the reference venous network in said band 204a-d, and optionally extracting at least one topological characteristic of the image of the reference venous network between two bands 204a-d.

The number of classes is determined for example by using a partitioning method of the K-Medoids type, where K is obtained by learning, on the database 106. The topological characteristics serve as a basis for the partitioning method; depending on the required partitioning properties, it is possible to take a single topological characteristic, all the topological characteristics or some of them.

Such a method is described in the document by L. Kaufman and P. Rousseeuw, under the title "Clustering by Means of Medoids" published by Fac., Univ. (1987).

As explained below, the number of classes must be sufficient to significantly reduce the response time in the case of the authentication/identification of a person.

To obtain good partitioning, it is necessary to minimise the intra-class variance so that the reference images of said class are very close, and to maximise the inter-class variance so that the reference images of the two classes are very far apart.

Thus, from a reference image $I_0$, another reference image $I_1$ is considered to belong to the class of the reference image $I_0$ if the distance between the reference image $I_0$ and the reference image $I_1$ is less than a minimum distance.

The distance between the reference image $I_0$ and the reference image $I_1$ is denoted $d(I_0, I_1)$, and is equal to the sum on each topological characteristic of type i, of the standardised distances between the topological characteristic of type i '$C_i^0$' of the reference image $I_0$ and the corresponding topological characteristic of type i '$C_i^1$' of the reference image $I_1$, that is to say:

$$d(I_0, I_1) = \sum_i d(C_i^0, C_i^1).$$

In the case of the surface of the image of the venous network 202, the distance is preferably the norm $L_1$. In the case of the geometric centre of the image of the venous network 202, the geometric dispersion of the image of the venous network 202, and the geometric centre of the bifurcations, the distance is preferably the norm $L_2$.

In the case of the orientation histogram of the branches, the distance is preferably the Bhattacharyya distance.

For each class, and for each topological characteristic of type i of said class, a reference topological characteristic of type i is determined. Several solutions can be envisaged for determining each reference topological characteristic of type i, for example:

each reference topological characteristic of type i can be equal to the mean topological characteristic of type i of a class consisting of the topological characteristics of the reference images of said class, or the image of the class is sought, the topological characteristics of which are the closest in terms of distance to those of the other images in the class, and the value of the topological characteristic of type i of said image is allocated to each reference topological characteristics of i.

The database 106 thus contains, for each class, the set consisting of the reference topological characteristics.

FIG. 3 shows an algorithm of a method 300 for the authentication/identification of a person used by the authentification/identification system 100.

The authentication/identification method 300 comprises:

a capture step 302 during which the infrared camera 104 captures an image of the venous network 150 illuminated by the illumination source 102, a transmission step 304 during which the infrared camera 104 transmits the image of the venous network 202 thus captured to the processing unit 108, a centring step 306 during which the processing unit 108 centres the image of the venous network 202 with respect to the display window 200, a cutting step 308 during which the processing unit 108 cuts the image of the venous network 202 thus centred into at least two bands 204a-d (here there are four bands) parallel to the axis of the finger 152, a first extraction step 310 during which the processing unit 108 extracts a set of at least one topological characteristic of each band 204a-d, a similarity step, also referred to as a distance step, 312 during which the processing unit 108 calculates, for each class of the database 106, a distance between the set thus extracted and all the reference topological characteristics of said class, a classification step 314 during which the processing unit 106 allocates the image of the venous network 202 to the class corresponding to the smallest distance, a comparison step 316 during which the processing unit 108 compares the image of the venous network 202 with each reference venous network image of the class to which the venous network image 202 is thus allocated, and a decision-taking step 318 during which the processing unit 108 takes a-decision concerning the authenticity/identity of the person from the result of the comparison step 316.

Thus the comparison step is carried out on a class with a small number of reference venous networks, which makes it possible to obtain authentication/identification more rapidly.

The centring of the image of the venous network 150 and the centring of the reference venous network images is done on the basis of the same display window 200. In the same way, the width of the bands is identical for the image of the venous network 150 and the reference venous network images.

The centring step 306 preferably consists of determining the contour of the finger 152 on the captured image and centring the position of the image of the venous network 202 on the display window 200 by centring the contour of the finger 152 with respect to the display window 200. It is possible to use for example the Canny Derriche contour detector described for example in the link http://en.wikipedia.org/wiki/Canny_edge_detector.

In the distance step 312, the calculation is done on two sets of topological characteristics that are based on the same topological characteristics. For example, if the reference set of topological characteristics comprises the surface of the image of the venous network and the geometric centre of the image of the venous network, then the set extracted also comprises the surface of the image of the venous network and the geometric centre of the image of the venous network.

It is also possible to increase the reliability of the method 300 by including a second extraction step 311, between the first extraction step 310 and the distance step 312. During the second extraction step 311, the processing unit 108 extracts a set of at least one topological characteristic relating to each pair of bands 204a-d and concatenates this set with the set obtained during the first extraction step 310 as a new set thus extracted.

To reduce the interferences related to noise or capture problems, the method 300 comprises a pre-processing step 305 between the transmission step 304 and the centring step 306. The pre-processing step 305 consists of cleaning the image of the venous network 202 captured, for example by connecting, on the image of the venous network 202, the branches that are in line with each other but are separate, or by deleting, on the image of the venous network 202, the branches that are too small; for example, it is judicious to delete the branches that are than ten pixels long.

Such cleanings are known to persons skilled in the art and are described for example in the link http://en.wikipedia.org/wiki/Mathematical_morphology.

In more general terms, the authentication/identification system 100 comprises:
- capture means 102, 104 provided for capturing an image of the venous network 150,
- transmission means provided for transmitting the image of the venous network 202 thus captured to the processing unit 108,
- centring means provided for centring the image of the venous network 202 with respect to the display window 200,
- cutting means provided for cutting the image of the venous network 202 into at least two bands 204a-d parallel to the axis of the finger 152,
- first extraction means provided for extracting a set of at least one topological characteristic of each band 204a-d,
- similarity means, also referred to as distance means, provided for computing, for each class of the database 106, a distance between the set extracted by the extraction means and all the reference topological characteristics of said class,
- classification means provided for allocating the image of the venous network 202 to the class corresponding to the shortest distance,
- comparison means provided for comparing the image of the venous network 202 with each reference venous network image of the class to which the image of the venous network 202 is allocated by the classification means, and
- decision-taking means provided for taking a decision concerning the authenticity/identity of the person from the comparison made by the comparison means.

In the case where the method 300 comprises a second extraction step 311, the authentication/identification system 100, and more particularly the processing unit 108, comprises second extraction means provided for extracting a set of at least one topological characteristic relating to each of bands 204a-d and for concatenating the set with the set obtained by the first extraction means as a new extracted set.

In the case where the method 300 comprises a pre-processing step 305, the authentication/identification system 100, and more particularly the processing unit 108, comprises pre-processing means for cleaning the image of the venous network 202 captured, by connecting, on the image of the venous network 202, the branches that are in line with each other but are separate, and/or by deleting on the image of the venous network 202 the branches that are too small.

The capture means are here the illumination source 102 and the infrared camera 104.

The transmission means are integrated in the infrared camera 104.

The centring means, the cutting means, the first extraction means, the distance means, the classification means, the comparison means, the decision-taking means, the second extraction means and the pre-processing means are here elements of the processing unit 108.

Naturally the present invention is not limited to the examples and embodiments described and depicted but is capable of numerous variants accessible to persons skilled in the art.

The invention claimed is:

1. A method for identifying/authenticating a person by an identification/authentication system comprising a capture device comprising a lens provided for capturing an image of a venous network of a finger of said person, a hardware processor, and a database containing reference venous network images partitioned by class according to topological characteristics and for each class a set of reference topological characteristics, the method comprising:
   - capturing an image of the venous network,
   - transmitting the image of the venous network thus captured to the hardware processor,
   - centering the image of the venous network with respect to a display window,
   - cuttings the image of the venous network thus centred into at least two bands parallel to the axis of the finger,
   - extracting a set of at least one topological characteristic of each band, as a first extraction,
   - calculating, for each class, a distance between the set thus extracted and all the reference topological characteristics of said class,
   - allocating the image of the venous network to the class corresponding to the smallest distance,
   - comparing the image of the venous network with each reference venous network image in the class to which the image of the venous network is thus allocated, and
   - takinges a decision concerning the authenticity/identity of the person from the result of the comparison step.

2. The identification/authentication method according to claim 1, wherein the method comprises, between the extracting and the calculating, extracting a set of at least one topological characteristic relating to each pair of bands and concatenates this set with the set obtained during the first extraction step as a new set thus extracted.

3. The identification/authentication method according to claim 1, wherein the method further comprises, between the transmission and the centring, cleaning the image of the venous network captured.

4. The identification/authentication method according to claim 1, wherein the topological characteristics are among the following topological characteristics:
   - for each band;
     - the surface area of the image of the venous network in the band,
     - the geometric centre of the image of the venous network in the band,
     - the geometric dispersion of the image of the venous network in the band,
     - the orientation histogram of the branches of the image of the venous network in the band,
     - the number of bifurcations in the branches of the image of the venous network in the band,
     - the geometric centre of the bifurcations in the band,
     - the geometric dispersion of the bifurcations in the band,
   - for each pair of bands:

the distance between the surface of the image of the venous network of the first band said pair, and the surface of the image of the venous network of the second band of said pair, the distance between the geometric centre of the image of the venous network of the first band of said pair and the geometric centre of the image of the venous network of the second band of said pair, the distance between the orientation histogram of the branches of the image of the venous network of the first band of said pair, and the orientation histogram of the branches of the image of the venous network of the second band of said pair.

5. A system for the identification/authentication of a person by the venous network of a finger, the system comprising:

a capture device comprising a lens provided for capturing an image of the venous network, a hardware processor, a database containing reference venous network images partitioned by class according to topological characteristics and for each class a set of reference topological characteristics, a transmitter provided for transmitting the image of the venous network thus captured to the hardware processor, the hardware processor configured to perform:

centring the image of the venous network with respect to the display window, cutting the image of the venous network into at least two bands parallel to the axis of the finger, extracting a set of at least one topological characteristic of each band, calculating, for each class of the database, a distance between the extracted set and the set of reference topological characteristics of said class, allocating the image of the venous network to the class corresponding to the smallest distance, comparing the image of the venous network with each reference venous network image of the class to which the image of the venous network is allocated by the classification means, and making a decision concerning the authenticity/identity of the person from the comparison.

6. The identification/authentication system according to claim 5, wherein the hardware processor is further configured to perform extracting a set of at least one topological characteristic relating to each pair of bands and for concatenating this set with the extracted set as a new extracted set.

7. The identification/authentication system according to claim 5, wherein the hardware processor is further configured to perform cleaning the image of the venous network captures.

* * * * *